United States Patent
Allingham

(10) Patent No.: US 8,474,561 B2
(45) Date of Patent: Jul. 2, 2013

(54) QUAD-BIKE VEHICLE WITH CARRIER DEVICE

(76) Inventor: William Allingham, Garrison (GB)

( * ) Notice: Subject to any disclaimer, the term of this patent is extended or adjusted under 35 U.S.C. 154(b) by 0 days.

(21) Appl. No.: 13/124,286

(22) PCT Filed: Jul. 8, 2009

(86) PCT No.: PCT/GB2009/001686
§ 371 (c)(1),
(2), (4) Date: Apr. 14, 2011

(87) PCT Pub. No.: WO2010/043837
PCT Pub. Date: Apr. 22, 2010

(65) Prior Publication Data
US 2011/0198142 A1  Aug. 18, 2011

(30) Foreign Application Priority Data
Oct. 14, 2008  (GB) .................................. 0818727.0

(51) Int. Cl.
*B60R 9/00* (2006.01)
*B60R 9/06* (2006.01)
*B62D 33/02* (2006.01)

(52) U.S. Cl.
USPC .................. 180/89.11; 280/727; 224/401

(58) Field of Classification Search
USPC ............... 180/89.11; 280/727, 769; 224/401, 224/42.12, 410, 511, 518, 519, 530, 548, 224/560, 561; 211/29; 242/403, 557, 594.5, 242/594.6
See application file for complete search history.

(56) References Cited

U.S. PATENT DOCUMENTS

| | | | |
|---|---|---|---|
| 2,541,084 A | | 2/1951 | Meier et al. |
| 4,099,760 A | * | 7/1978 | Mascotte et al. ............... 293/115 |
| 5,433,357 A | * | 7/1995 | Alliff ............................. 224/510 |

(Continued)

FOREIGN PATENT DOCUMENTS

EP    1714861    10/2006

OTHER PUBLICATIONS

International Search Report of the International Searching Authority from corresponding International Application No. PCT/GB2009/001686, mailed Nov. 19, 2009.

(Continued)

*Primary Examiner* — Joseph Rocca
(74) *Attorney, Agent, or Firm* — Gardner, Linn, Burkhart & Flory, LLP

(57) ABSTRACT

A quad-bike vehicle (10) having a chassis (12), four wheels (14) rotatably mounted on the chassis (12), an engine (16) for driving at least two of the wheels (14), a seat (18) for a user, a handlebar (20) for steering at least two of the wheels (14), a tow-hitch (22), and a carrier device (24) for mounting on the tow-hitch (22). The carrier device (24) has a foldable platform (26), a back (28), and a tow-hitch attachment element (32) for releasable attachment to the tow-hitch (22). The platform (26) is foldable towards the back (28) to adopt a storage condition, and is foldable down to adopt an in use condition. Preferably, the platform (26) and the back (28) are both planar or substantially planar so that, when folded together, the platform (26) and the back (28) lie in parallel or substantially parallel with each other. With the platform folded down, the carrier device is spaced from the ground. A carrier device (24) which is specifically adapted for a quad-bike vehicle (10) is also provided.

20 Claims, 8 Drawing Sheets

U.S. PATENT DOCUMENTS

| | | | | |
|---|---|---|---|---|
| 5,439,152 | A * | 8/1995 | Campbell | 224/405 |
| 5,568,900 | A * | 10/1996 | Conroy | 242/557 |
| 5,582,216 | A * | 12/1996 | Smith et al. | 140/107 |
| 6,447,032 | B1 * | 9/2002 | Howell, Sr. | 293/115 |
| 6,461,095 | B1 * | 10/2002 | Puska | 414/462 |
| 6,502,728 | B2 * | 1/2003 | Savant | 224/401 |
| 6,732,892 | B1 | 5/2004 | Mangrum | |
| 6,968,917 | B2 * | 11/2005 | Rondeau et al. | 180/89.1 |
| 7,823,901 | B2 * | 11/2010 | Waddell | 280/401 |
| 8,104,160 | B2 * | 1/2012 | Wohlgemuth | 29/428 |
| 2004/0100045 | A1 | 5/2004 | Amacker | |
| 2005/0173584 | A1 * | 8/2005 | Fletcher et al. | 242/419.4 |
| 2006/0237502 | A1 | 10/2006 | Tweet et al. | |

OTHER PUBLICATIONS

Written Opinion of the International Searching Authority from corresponding International Application No. PCT/GB2009/001686, dated Apr. 14, 2011.

* cited by examiner

QUAD-BIKE VEHICLE WITH CARRIER DEVICE

CROSS REFERENCE TO RELATED APPLICATIONS

This application claims the priority benefits of International Application No. PCT/GB2009/001686, filed on Jul. 8, 2009, and also of Great Britain Application No. GB 0818727.0, filed on Oct. 14, 2008, which are hereby incorporated herein by reference in their entireties.

FIELD OF THE INVENTION

The present invention relates to a carrier device for quad-bike vehicle.

BACKGROUND OF THE INVENTION

Quad-bike vehicles are well known, and are commonly referred to as simply 'quad bikes'. A quad bike has the general appearance of a motorbike, but with two wheels positioned fore and aft and outboard of the seat, instead of a single wheel fore and aft and in line with the seat.

These quad-bike vehicles are highly useful for farmers and others who work outdoors. The vehicle is light and will easily traverse most-types of open terrain, without leaving furrows and ruts which a heavy tractor does. The quad-bike vehicle is also far more fuel efficient than other types of larger machinery, like tractors for example.

However, a quad bike only has relatively small front and rear racks mounted above the wheel axles on the body or chassis for carrying equipment and supplies. The racks are flat, stationary and fixed, enabling items to be tied down thereto, but larger items of farm equipment, fencing materials, such as posts and bundles of fencing wire, as well as farm animals, cannot be easily transported via this type of vehicle without the use of a trailer. Unfortunately, a trailer hinders the maneuverability of the quad-bike vehicle, and also, whilst attached, prevents some functions, such as tensioning of fencing wire, from being performed.

SUMMARY OF THE INVENTION

According to a first aspect of the invention, there is provided a quad-bike vehicle having a chassis, four wheels rotatably mounted on the chassis, an engine for driving at least two of the wheels, a seat for a user, a handlebar for steering at least two of the wheels, a tow-hitch, and a carrier device for mounting on the tow-hitch, the carrier device having a foldable platform, a back, and a tow-hitch attachment element for releasable attachment to the tow-hitch, the platform being foldable towards the back to adopt a storage condition, and being foldable down to adopt an in use condition, when folded down, the carrier device being spaced from the ground.

According to a second aspect of the invention, there is provided a carrier device for a quad-bike vehicle, the carrier device having a foldable platform for transporting at least a farm animal and/or fencing material, a back, and a tow-hitch attachment element for releasable attachment of the carrier device to a tow-hitch of a quad bike, the platform being foldable towards the back to adopt a storage condition, and being foldable down to extend at right angles or substantially at right angles to the back to adopt an in use condition, a stop being provided at a pivot between the back and the platform.

According to a third aspect of the invention, there is provided a quad-bike vehicle having a chassis, four wheels rotatably mounted on the chassis, an engine for driving at least two of the wheels, a seat for a user, a handlebar for steering at least two of the wheels, and a removably mountable frame having a plurality of upstanding posts for holding fence posts therebetween.

According to a fourth aspect of the invention, there is provided a quad-bike vehicle having a chassis, four wheels rotatably mounted on the chassis, an engine for driving at least two of the wheels, a seat for a user, a handlebar for steering at least two of the wheels, and a container element having a base and sides, the container element being removably mountable in front of and/or behind the seat.

According to a fifth aspect of the invention, there is provided a quad-bike vehicle having a chassis, four wheels rotatably mounted on the chassis, an engine for driving at least two of the wheels, a seat for a user, a handlebar for steering at least two of the wheels, a tow-hitch, and a fencing wire tensioning device connectable to the tow-hitch and to which fencing wire is engagable for pulling.

BRIEF DESCRIPTION OF THE DRAWINGS

The invention will now be more particularly described, by way of example only, with reference to the accompanying drawings, in which.

DESCRIPTION OF THE PREFERRED EMBODIMENTS

Figure 1:
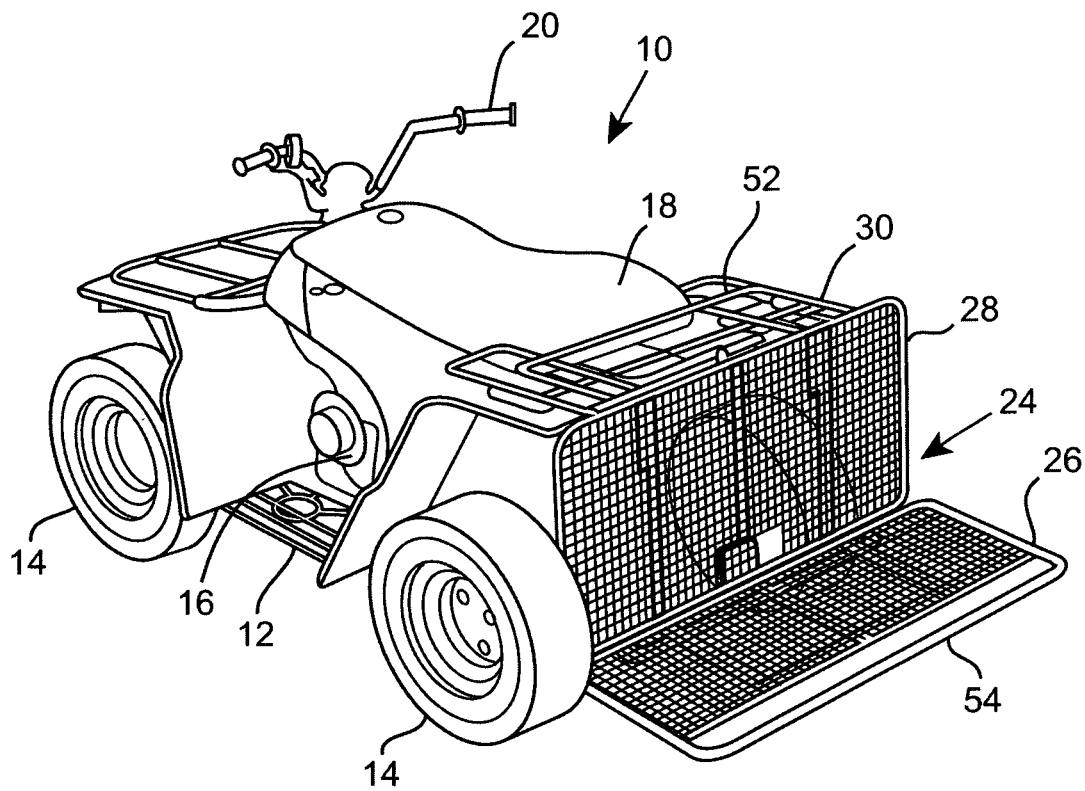
FIG. 1 shows a perspective view of a first embodiment of a quad-bike vehicle having a carrier device, in accordance with the invention.
Figure 2:
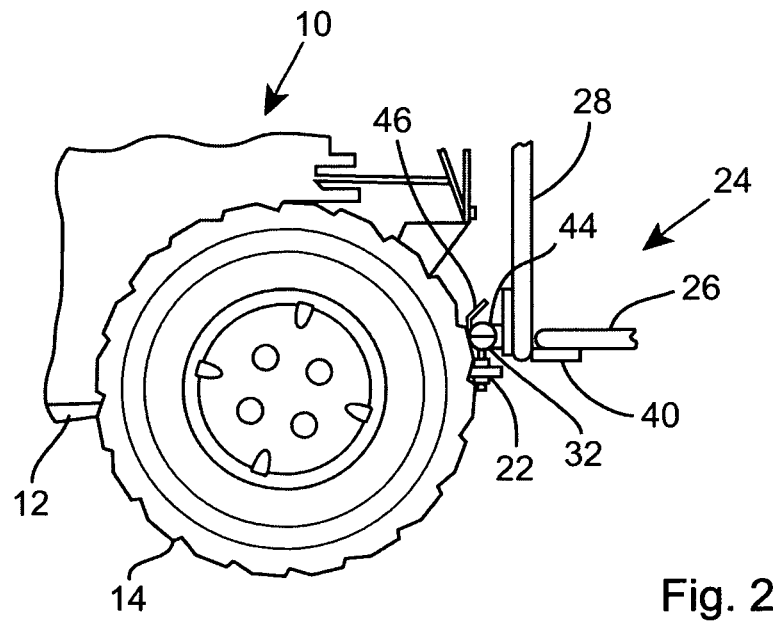
FIG. 2 shows a side view of the carrier device attached to the quad-bike vehicle.
Figure 3:
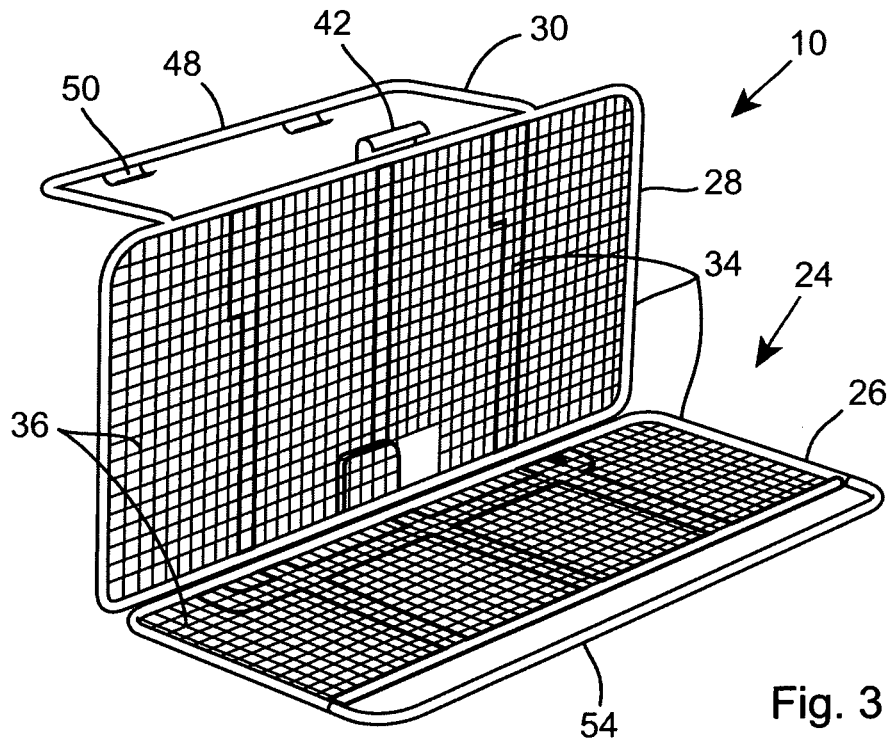
FIG. 3 shows the carrier device detached from the quad-bike vehicle, and in a first open condition.
Figure 4:
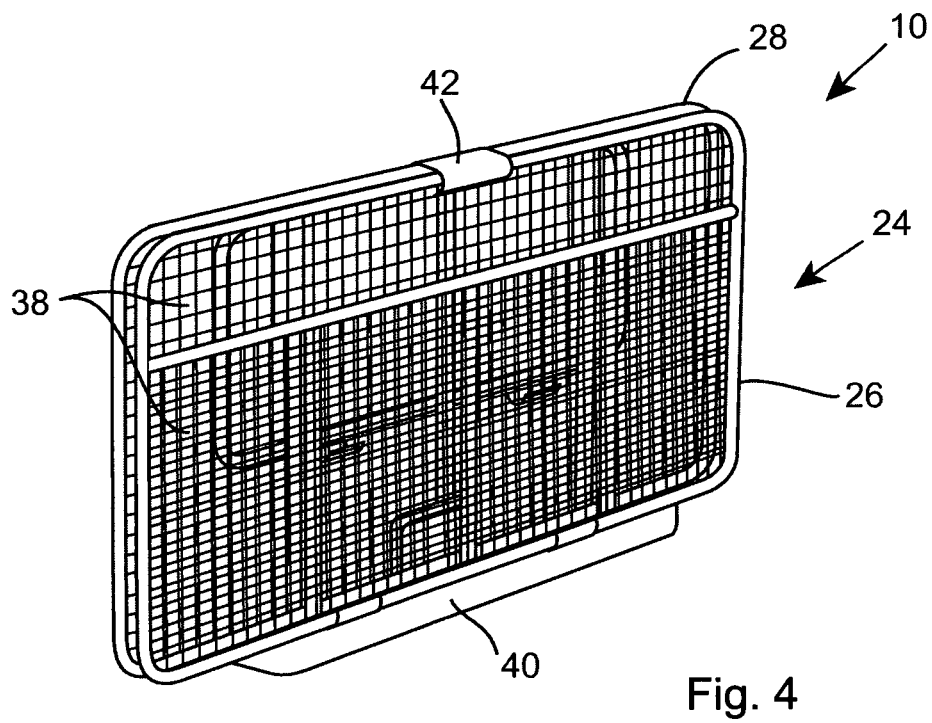
FIG. 4 shows the carrier device in a second storage condition.
Figure 5:
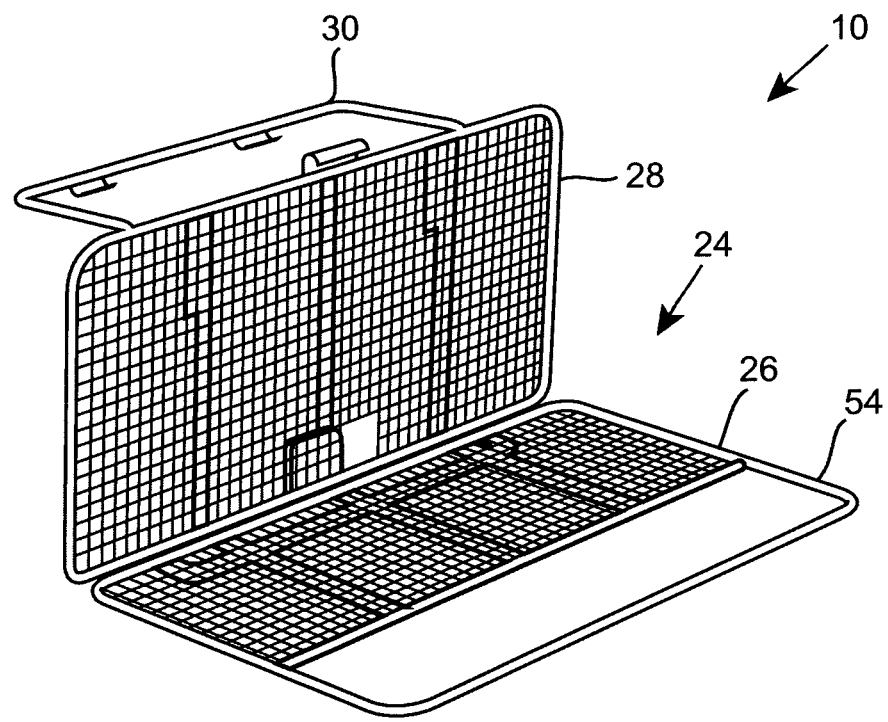
FIG. 5 shows the carrier device with a bar element extended.

Referring firstly to FIGS. 1 to 8 of the drawings, there is shown a quad-bike vehicle 10 which comprises a chassis 12, four wheels 14 rotatably mounted on the chassis 12, typically an internal combustion engine 16 for driving at least two of the wheels 14, and in this case for driving all four wheels, a seat 18 for a user, a handlebar 20 for steering at least two of the wheels 14, a tow-hitch 22 extending from a rear of the chassis 12, and a carrier device 24 for mounting on the tow-hitch 22 to be in spaced relationship from the ground when in use.

The carrier device 24 comprises a rigid foldable platform 26, a rigid back 28 having a lower edge to which a back edge of the platform 26 is solely pivotably, such as hingably, connected, a pivotable retaining element 30 which is hingably connected to an upper edge of the back 28, and a tow-hitch attachment element 32.

The platform 26 and back 28 are both planar or substantially planar, in other words flat and without or substantially without sides, and comprise a metal framework 34 which supports a strong wire metal grid, grill or mesh 36. The mesh 36 provides a plurality of openings 38, which is useful for drainage. A stop 40 is also included along the hinging edge. The hinge and stop are the only points of connection between the platform and the back, when the platform is lowered, so that wide overhanging loads can be carried without obstruction at the sides. The platform 26 can be folded up to abut or substantially abut the back 28, and thus lie in parallel or substantially in parallel therewith when in a storage condition, and can be folded down away from the back 28 to the stop 40 in which it is at or substantially at right angles to the back 28. A detent or hook 42 is provided on the back 28 to hold the platform 26 in its raised or folded up condition.

Both the back 28 and the platform 26 extend across the back of the chassis 12 of the quad-bike vehicle 10 to or substantially to an outer edge of the rear wheels 14. The platform is held raised away from the ground, and the carrier device is devoid of wheels so that the platform remains level with the chassis at all times, even over rough terrain.

The tow-hitch attachment element 32 includes an inverted cup 44 and a releasable detent 46 for locking the cup 44 over the tow-hitch 22. The tow-hitch attachment element 32 extends from the lower edge of the back 28 and in a direction which is opposite to the platform 26.

The retaining element 30 includes a pivotable arm member 48 being in the form of an elongate U-shaped bar which extends from the back 28, and a further detent or one or more hooks 50 partway along its longitudinal extent. A pivot axis of the arm member 48 is in parallel or substantially parallel with a pivot axis of the platform 26. The detent or one or more hooks 50 are releasably fastenable to a fixed rack 52 mounted behind the seat 18 of the quad-bike vehicle 10, which is connected through the body of the vehicle 10 to the chassis 12. Load bearing of the carrier device 24 is thus taken by the tow-hitch 22, with the carrier device 24 being retained in its correct operational orientation by the connection of the retaining element 30 with the rack 52 of the vehicle 10.

To increase the utility of the carrier device 24, the platform 26 includes a rigid metal elongate U-shaped bar element 54 which, in this embodiment, has arms which slidably telescopically extend from and retract into outermost tubes of the framework 34 of the platform 26. Although slideable and telescopic, the bar element could pivot from the platform 26, and in this case it may rotate within or parallel to the plane of the platform 26, or unfold therefrom out of the plane of the platform 26. The bar element 54 is particularly useful in supporting wider or deeper loads placed on the in use platform 26.

Figure 6:
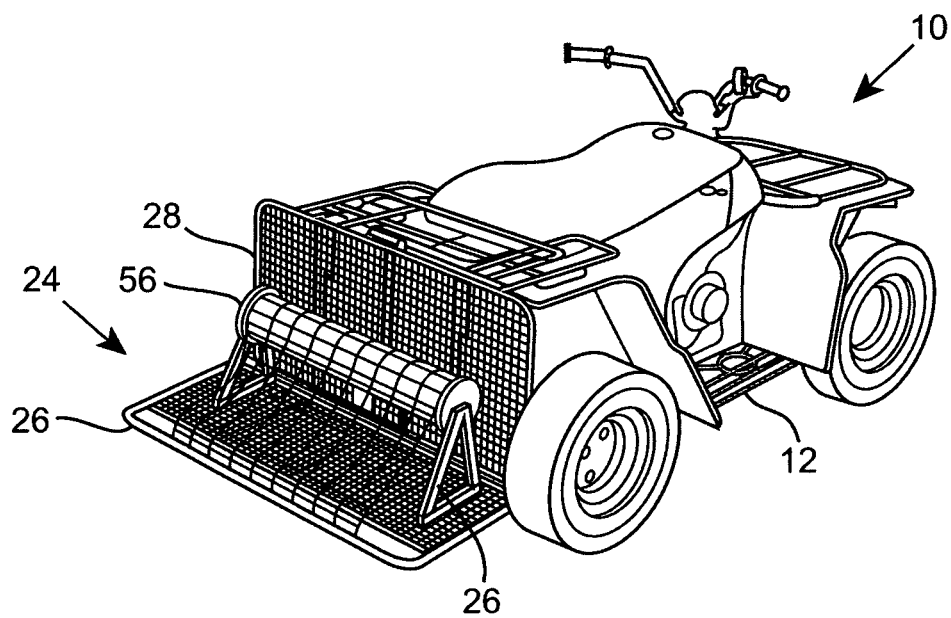
FIG. 6 shows the quad-bike vehicle with the carrier device and having a spool of fencing wire thereon.
Figure 7:
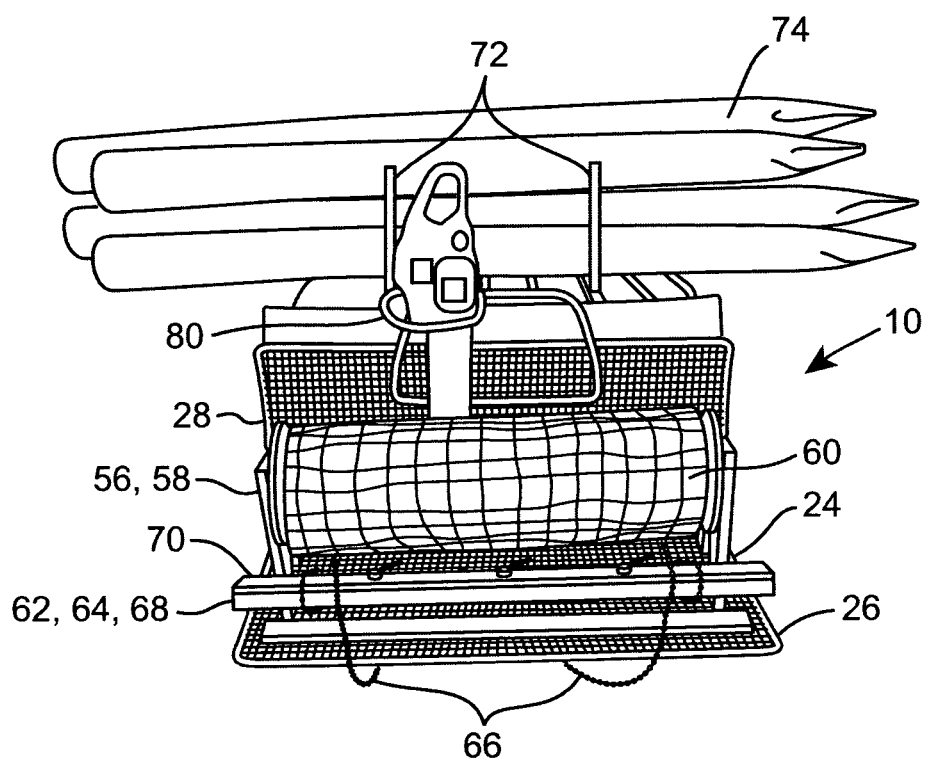
FIG. 7 shows the quad-bike vehicle with the carrier device and having the spool of fencing wire, removable posts, and a fencing wire tensioning device.
Figure 8:
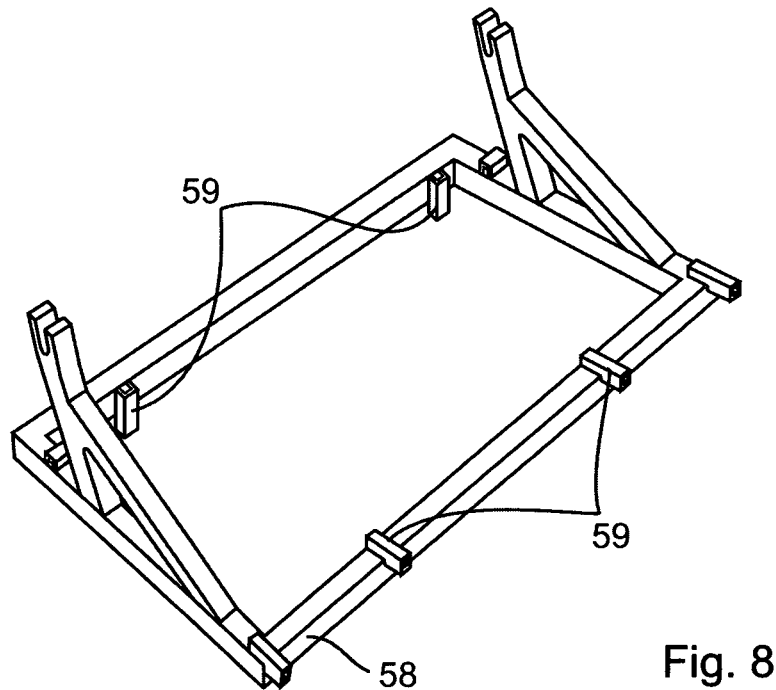
FIG. 8 shows a stand for holding the spool of fencing wire.

To aid with erecting fencing, a spool 56 which is rotatably supported by a stand 58 is also provided as part of the carrier device 24. This is best shown in FIGS. 6 and 7. The spool 56 and stand 58 are demountable from the platform 26. The stand 58 is held to the platform 26 when in use, typically via a plurality of short legs 59 which slot through the mesh of the platform and the back, shown in FIG. 8. However, chains or other suitable fastening means can also be envisaged. The spool 56 extends across a majority of the platform 26, and has a longitudinal extent sufficient to hold a reel of flexible mesh fencing wire 60. A rotational axis of the spool 56, when mounted on the platform 26, extends in parallel or substantially parallel with rotational axes of the rear wheels 14 of the quad-bike vehicle 10. In use, a reel of fencing wire 60 is mounted on the spool 56. A portion of the wire is unwound, and held in place, typically by a first fence post. The quad-bike vehicle 10 is then driven to a position which is just past a position of a next fixing point or fence post. As the vehicle 10 is moved, so the fencing wire 60 unwinds from the spool 56.

Figure 11:
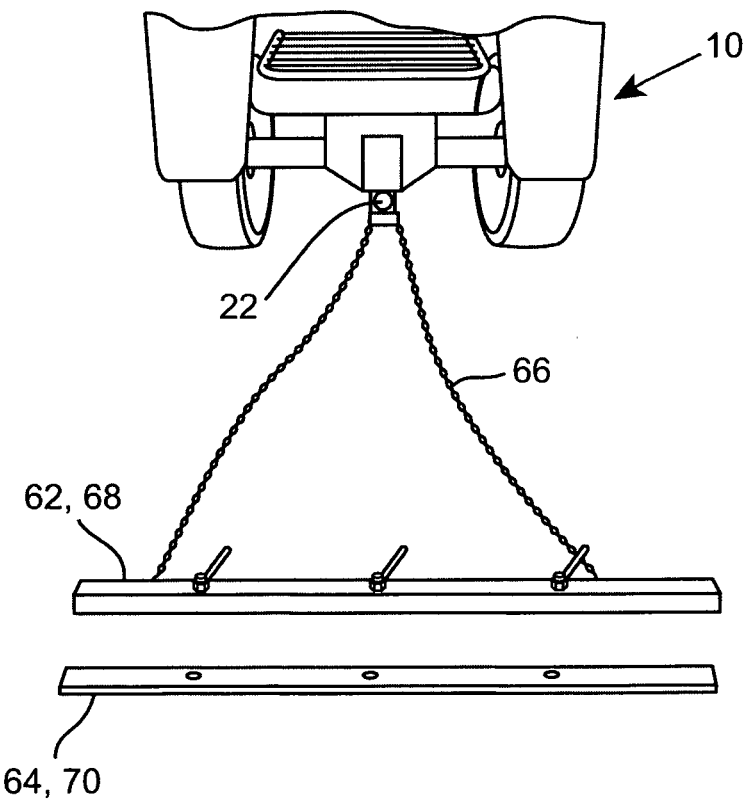
FIG. 11 shows a fencing wire tensioning device with the carrier device removed for clarity.
Figure 12:
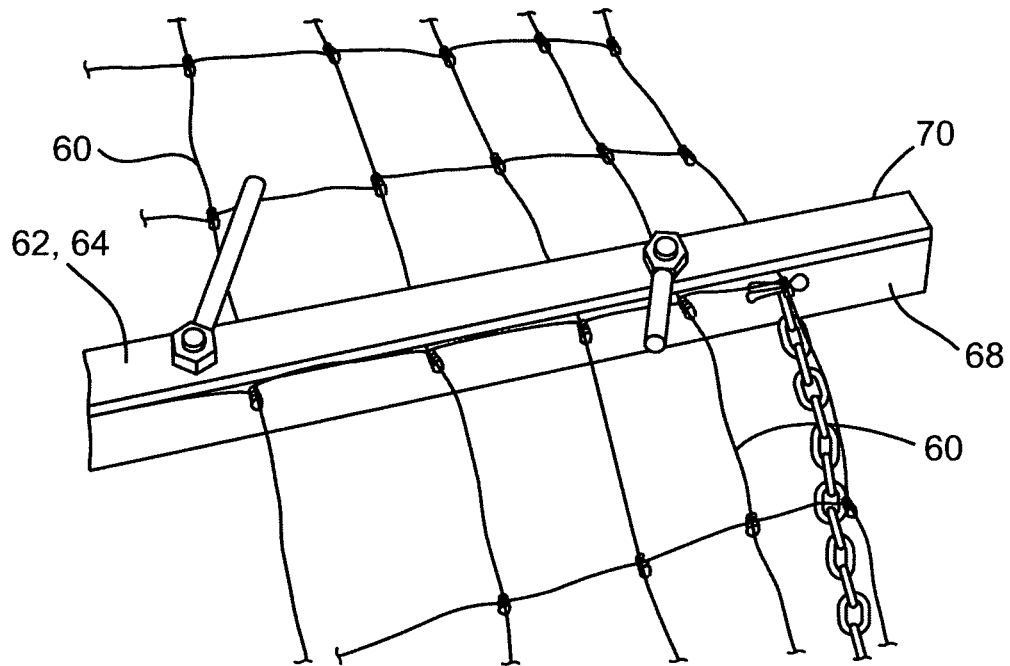
FIG. 12 is an enlarged view of the fencing wire tensioning device, when in use.
Figure 13:
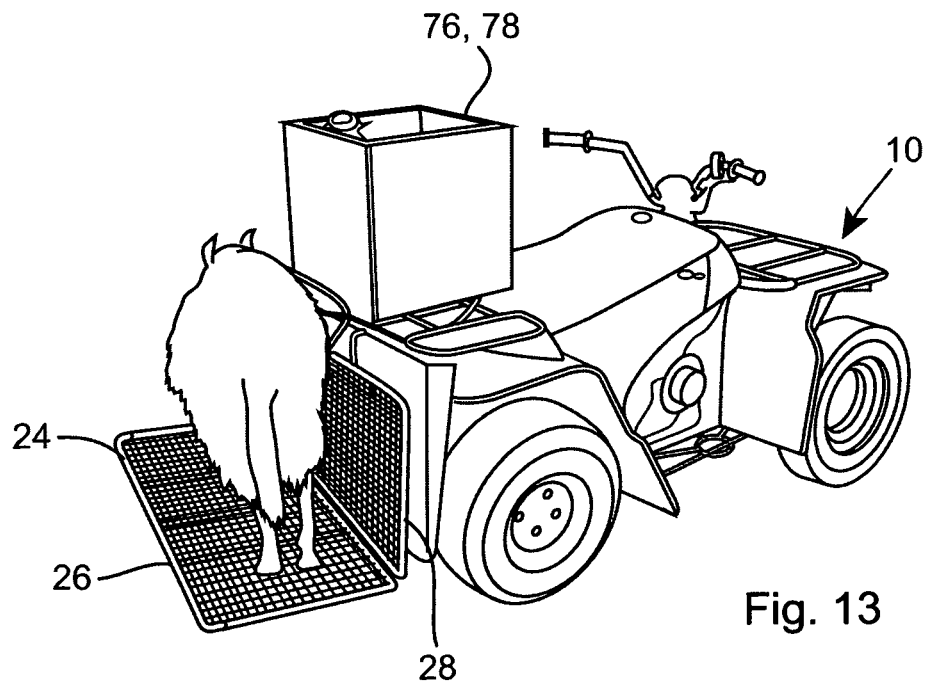
FIG. 13 shows a removable container element which is supportable by the carrier device.

To tension the unwound fencing wire 60 prior to fixing, the quad-bike vehicle 10 is provided with a fencing wire tensioning device 62 connectable to the chassis 12, and optionally to the tow-hitch as shown in FIG. 11, and to which the fencing wire 60 is engagable for pulling, as shown in FIG. 12. The fencing wire tensioning device 62 comprises an elongate clamp element 64 which has a longitudinal extent which extends to or beyond an outer edge of the rear wheels 14, and an attachment element 66 for attaching the clamp element 64 to the chassis 12 of the vehicle 10. The clamp element 64 includes an elongate rectilinear metal bar 68 with an elongate rectilinear clamping plate 70 of substantially matching longitudinal dimension. The clamping plate 70 is releasably fastenable to the bar 68 so that the longitudinal extents lie in parallel. In use, the fencing wire 60 is clamped to the bar 68 by the clamping plate 70, typically by the use of a plurality of screw-threaded fasteners. The attachment element 66, in this case being an elongate flexible metal chain, is passed around the tow-hitch 22 with the carrier device 24 still attached or removed, and the vehicle 10 is driven to until the attachment element 66 becomes taught, thus tensioning the fencing wire 60. The fencing wire 60 can then be easily fixed to the ground, typically via a fence post or posts. When not in use, the fencing wire tensioning device 62 can be carried on the platform 26 of the carrier device 24, and is releasably fastened thereto, for example, by the attachment element 66.

Figure 10:
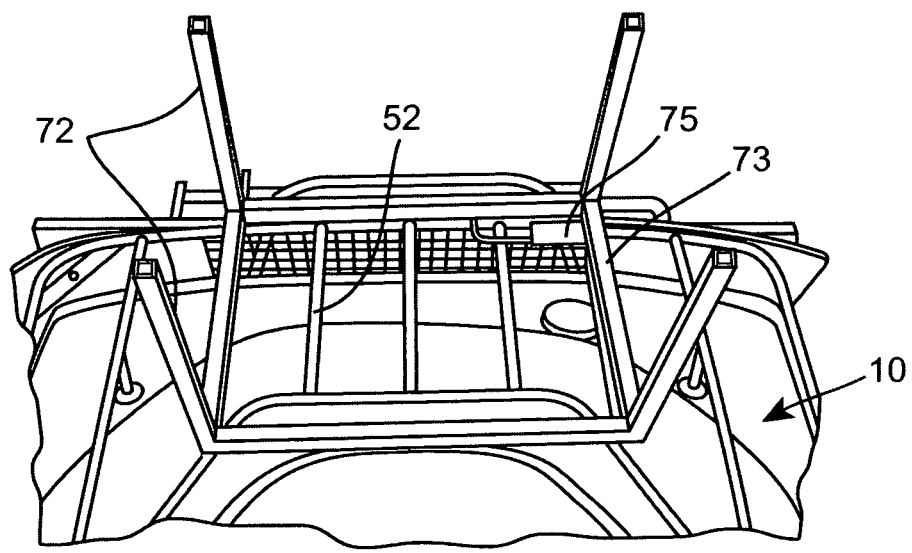
FIG. 10 shows a frame and posts for mounting to the carrier device or rack.

Furthermore, to again aid with erecting fencing, a plurality of upstanding or substantially vertical spaced-apart posts 72 on a frame 73 is removably mountable on the retaining element 30, the back 28, and/or the fixed rack 52. See FIG. 10. A sprung detent 75 is utilised in this embodiment to releasably lock the frame 73 in place. Fence posts 74 can thus be laid between the posts 72 and on the frame 73. The posts 72 act as stays, whilst keeping the platform 26 free for supporting other items, such as the spool 56 and stand 58 mentioned above. It is envisaged that the posts 72 can, additionally or alternatively, be provided on the platform 26 also, enabling safe transportation of fence posts 74 or other elongate objects.

Figure 9:
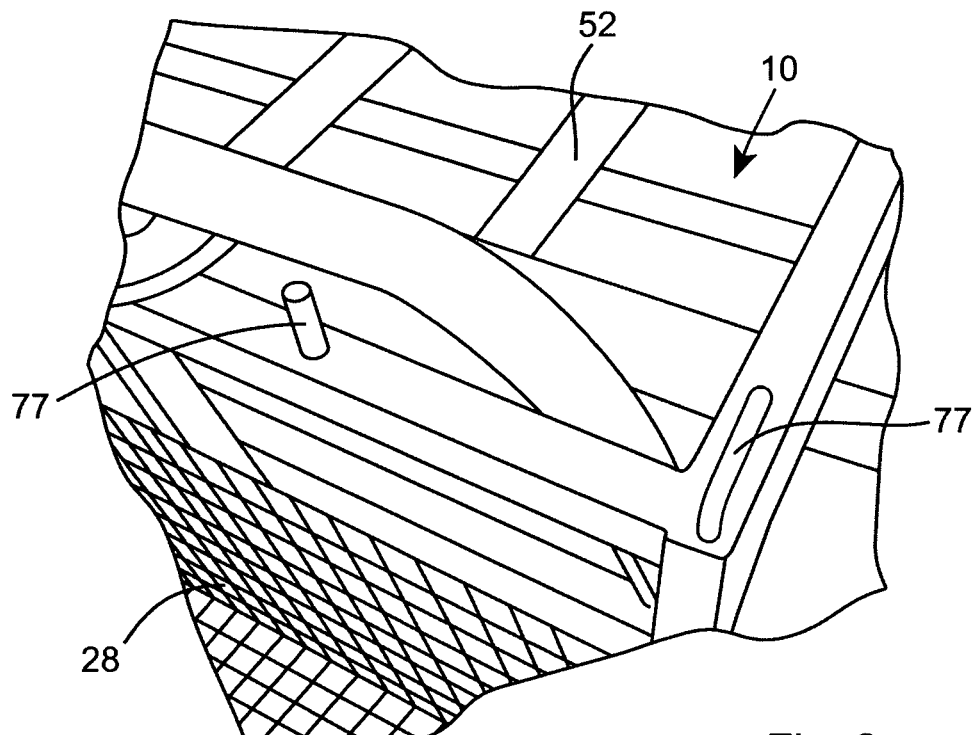
FIG. 9 shows an enlarged view of the carrier device, showing a hook and peg for tying off a strap or chain.

The platform 26, in its lowered condition, is suitably strong enough to support one or more farm animals, such as sheep, and is conservatively rated to support up to 200 kg. The animal to be transported is securely strapped or chained to the platform 26 and back 28. Conveniently, a plurality of tie-down hooks and/or short upright pegs 77, as shown in FIG. 9, are provide around the platform 26 and back 28 to engage straps or chains.

To allow transportation of further smaller animals, such as one or more lambs, a removable container element 76 can be releasably fastened to the retaining element 30 or fixed rack 52. This is particularly beneficial for farmers during lambing season. The container element 76 has a base and at least one side 78, being in this case four which are contiguous. The base and sides 78 may be solid or have openings 38, and may be collapsible for storage or fixed.

The container element 76 may be received on the posts 72, or one or more clips, for example, may be provided on the base to releasably attach the container element 76 to the retaining element 30 of the carrier device 24, or directly to the fixed rack 52. By use of the container element 76, which, in this embodiment, extends less than the width of the quad-bike vehicle 10, the platform 26 is left available for supporting other, typically larger, items.

The back 28 of the carrier device 24 may also include one or more tool holders 80, being for example loops, for holding a tool, such as a chainsaw.

When not in use, the platform 26 of the carrier device 24 can be folded up to the back 28, making for a very slim rearwardly projecting depth. Alternatively, the carrier device 24 can be easily unhitched, should for example a trailer need to be used.

It is possible that a secondary tow-hitch can be provided on the carrier device 24 itself, so that the carrier device 24 does not have to be removed when a trailer needs to be towed.

In a second embodiment of the quad-bike vehicle having a carrier device, like references refer to like parts, and further detailed description is omitted. In this embodiment, a different retaining element 130 is used, but all other features remain the same.

Figure 14A:
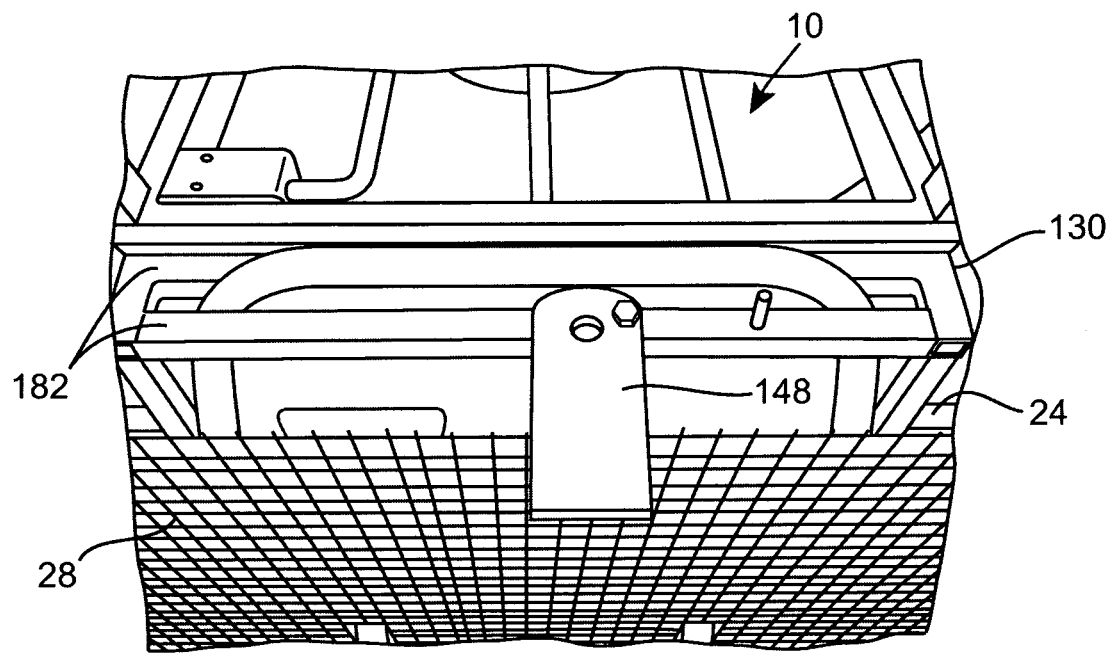
FIGS. 14a and 14b show a second embodiment of a quad-bike vehicle having a carrier device, in accordance with the invention.
Figure 14B:
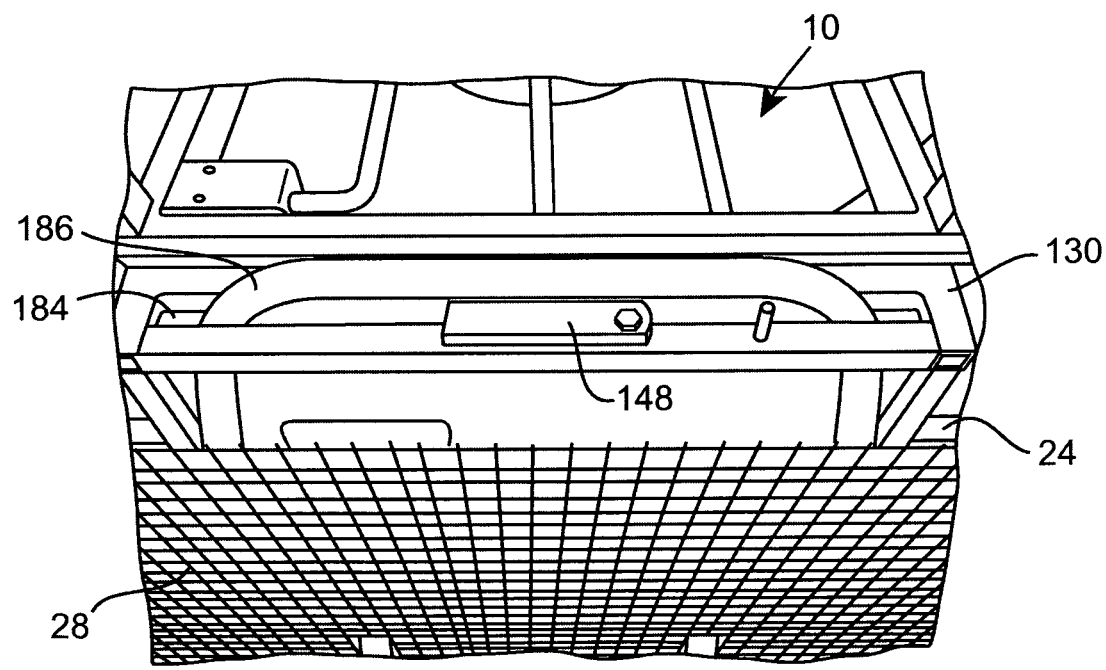

The retaining element 130 of the second embodiment includes two spaced and fixed parallel bars 182 which provide a slot 184 for a top of a bull-bar 186 to be received therein, as shown in FIGS. 14a and 14b. The pivotable arm member 148 is a rotatable tongue which rotates in a plane which is parallel to the plane of the in use unfolded platform 26. With an upper strut of the bull-bar 186 received in the slot 184, the rotatable tongue 148 is turned until received beneath the upper strut of the bull-bar 186, thus locking the back 28 in place.

Typically, the tow-hitch is provided at a rear of the quad-bike vehicle. However, if a tow-hitch is provided at a front of the quad-bike vehicle, the above-described carrier device can also be front mounted.

The carrier device is removable from the quad-bike vehicle by unhitching from the tow-hitch. However, the carrier device could be permanently attached to the chassis of the quad-bike vehicle, dispensing with the need for the tow-hitch.

The extendable bar element may include a locking mechanism to hold the bar element in the extended and/or retracted state. The locking mechanism may be projecting spring-loaded buttons. Alternatively, the bar element may be freely slidable before the platform is loaded.

The pivotable arm member of the retaining element may also be extendable and retractable to accommodate different quad-bike vehicles. Again, a locking mechanism as described previously can be used to lock the arm member in place.

If the carrier device is removable, then any suitable retaining element or retaining means can be utilised.

The carrier device can be provided independently of the quad-bike vehicle, and thus fitted retrospectively, or can be provided on the quad-bike vehicle during manufacture or at the time of purchase. The carrier device is specifically adapted for use, and may be adapted exclusively for use, with a quad-bike vehicle.

Since the quad-bike vehicle usually has a flat rack also at the front, a further set of upstanding or substantially vertical spaced-part posts on a frame may be removably mountable thereto for holding further fence posts or other objects.

The term 'tow-hitch' used throughout is intended to include a ball-hitch and tow-bar. It is thus possible to provide a quad-bike vehicle with a carrier device for carrying and transporting loads.

It is also possible to provide a carrier device which has a foldable platform, and which is removably mountable to a tow-hitch of the vehicle. The carrier device is light, due to the use of mesh on a frame, quick to attach and remove, and compactable for storage. Furthermore, a plurality of posts, a fencing wire spool, and/or a fencing wire tensioning device can also be provided, either as part of the carrier device or separately.

The embodiments described above are provided by way of examples only, and various other modifications will be apparent to persons skilled in the art without departing from the scope of the appended claims.

The invention claimed is:

1. A quad-bike vehicle comprising:
   a chassis;
   four wheels rotatably mounted on the chassis;
   an engine for driving at least two of the wheels;
   a seat for a user;
   a handlebar for steering at least two of the wheels;
   a tow-hitch;
   a carrier device for mounting on the tow-hitch, the carrier device having a foldable platform, a back, and a tow-hitch attachment element for releasable attachment to the tow-hitch, the platform being foldable towards the back to adopt a storage condition, and being foldable down to adopt an in use condition;
   wherein the carrier device further includes a retaining element via which the back of the carrier device is connectable, either directly or indirectly, to the chassis; and
   wherein the retaining element includes a pivotable arm element which is pivotably connected to the back of the carrier device.

2. A quad-bike vehicle as claimed in claim 1, wherein the carrier device includes a stop at a pivot between the back and the platform.

3. A quad-bike vehicle as claimed in claim 2, wherein the stop is the sole means for holding the platform in its in use condition.

4. A quad-bike vehicle as claimed in claim 1, wherein the platform and the back are both planar or substantially planar so that, when folded together, the platform and the back lie in parallel or substantially parallel with each other.

5. A quad-bike vehicle as claimed in claim 1, wherein the back and the platform extend or substantially extend to an outside edge of the wheels.

6. A quad-bike vehicle as claimed in claim 1, wherein the platform of the carrier device includes a plurality of openings.

7. A quad-bike vehicle as claimed in claim 1, wherein the carrier device includes a framework structure and mesh supported by the framework structure.

8. A quad-bike vehicle as claimed in claim 1, wherein the pivotable arm element includes a hook, which extends from a free end of the arm element.

9. A quad-bike vehicle as claimed in claim 8, wherein an axis of rotation of the pivotable arm element is parallel or substantially parallel to an axis of rotation of the foldable platform.

10. A quad-bike vehicle as claimed in claim 1, wherein an axis of rotation of the pivotable arm element is perpendicular or substantially perpendicular to an axis of rotation of the foldable platform.

11. A quad-bike vehicle as claimed in claim 1, wherein the in use platform extends at right angles or substantially at right angles to the back.

12. A quad-bike vehicle as claimed in claim 1, wherein the carrier device includes a bar element which is extendable from the platform.

13. A quad-bike vehicle as claimed in claim 12, wherein the bar element is telescopically extendable from and retractable into the platform.

14. A quad-bike vehicle as claimed in claim 1, wherein the carrier device further includes a rotatable spool which is supportable by the platform, the spool being adapted for holding fencing wire.

15. A quad-bike vehicle as claimed in claim 14, wherein the carrier device further includes a stand on which the spool is rotatably mounted, the stand being disengagably attachable to the platform.

16. A quad-bike vehicle as claimed in claim 1, further comprising a fencing wire tensioning device connectable to the chassis and to which fencing wire is engagable for pulling.

17. A quad-bike vehicle as claimed in claim 16, wherein the fencing wire tensioning device is engagable with the carrier device.

18. A quad-bike vehicle as claimed in claim 1, wherein the carrier device further includes a plurality of removably mountable posts.

19. A quad-bike vehicle as claimed in claim 1, wherein the carrier device further includes a removable container element having a base and sides.

20. A quad-bike vehicle as claimed in claim 19, wherein the container element is detachably engagable with the carrier device at a position which is spaced from the platform.

\* \* \* \* \*